United States Patent Office 2,720,529
Patented Oct. 11, 1955

2,720,529

PROCESS OF PREPARING 1-CARBOALKOXYMETH-YLENE - 2 - METHALLYL - 2,4b - DIMETHYL - 4 - KETO - 7 - ETHYLENEDIOXY - 1,2,3,4,4a,4b,5,6,7,-8,10,10a-DODECAHYDROPHENANTHRENE

Max Niklaus Feurer, Riehen, Switzerland, assignor to Merck & Co., Inc., Rahway, N. J., a corporation of New Jersey No Drawing. Application January 21, 1953,
Serial No. 332,574

2 Claims. (Cl. 260—340.9)

This invention is concerned generally with dimethyl-cyclopentanopolyhydrophenanthrene compounds and with processes of preparing them. More particularly, it relates to a novel process for preparing 1-carboalkoxymethylene-2 - methallyl - 2,4b - dimethyl - 4 - keto - 7 - ethylenedioxy - 1,2,3,4,4a,4b,5,6,7,8,10,10a - dodecahydrophenanthrene starting with the corresponding 1-hydroxy-1-carboalkoxymethyl-2-methallyl-2,4b-dimethyl-4-keto-7-ethylenedioxy-1,2,3,4,4a,4b,5,6,7,8,10,10a-dodecahydrophenanthrene.

In accordance with my novel procedure 1-hydroxy-1-carboalkoxymethyl - 2 - methallyl - 2,4b - dimethyl-4-keto-7-ethylenedioxy-1,2,3,4,4a,4b,5,6,7,8,10,10a-dodecahydrophenanthrene (Compound 1 hereinbelow) is reacted with thionyl chloride thereby forming 1-carboalkoxymethylene-2-methallyl-2,4b-dimethyl-4-keto-7-ethylene-dioxy-1,2,3,4,4a,4b,5,6,7,8,10,10a - dodecahydrophenanthrene (Compound 2); this reaction may be chemically represented as follows:

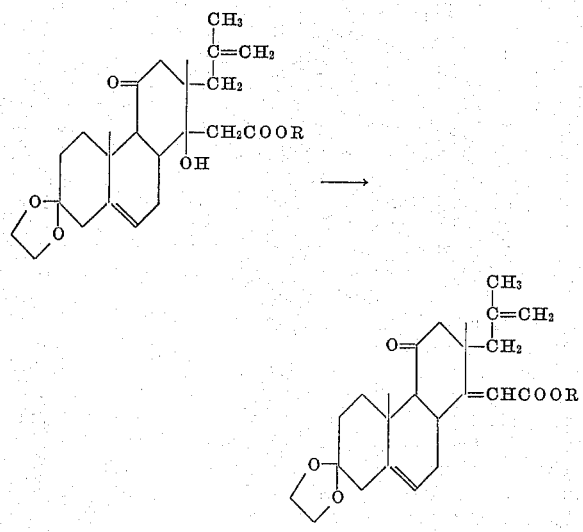

Compound 1                Compound 2 wherein R is a lower alkyl radical. The 1-carboalkoxymethylene-2-methallyl-2,4b-dimethyl-4-keto-7-ethylenedioxy-1,2,3,4,4a,4b,5,6,7,8,10,10a-dodecahydrophenanthrene thus obtained is valuable as an intermediate in the preparation of steroid hormones such as cortisone.

The 1-hydroxy-1-carboalkoxymethyl-2-methallyl-2-,4b-dimethyl - 4-keto-7-ethylenedioxy-1,2,3,4,4a,4b,5,6,7,8,10, 10a-dodecahydrophenanthrene used as starting material in my process, is a new compound which may be prepared according to the following procedure: β-ethoxy-propionaldehyde is reacted with ethyl magnesium bromide to produce 1-ethoxy-3-hydroxy-pentane which is reacted with chromic acid thereby oxidizing the hydroxy substituent to form 1-ethoxy-3-keto-pentane; the latter compound is treated with ethyl ortho formate and ethanol in the presence of hydrogen chloride to produce 1,3,3-triethoxy-pentane which, upon reaction with hot potassimum bisulfate, is converted to 3-ethoxy-1,3-pentadiene. The 3-ethoxy-1,3-pentadiene is reacted with benzoquinone in accordance with the Diels-Alder condensation procedure to produce 5-methyl-6-ethoxy-1,4,4a,5,8,8a-hexahydronaphthalene-1,4-dione which is then reacted with hydrogen in the presence of Raney nickel catalyst to form 5-methyl-6-ethoxy-1,2,3,4,4a,5,8,8a-octahydronaphthalene-1,4-dione; the latter compound is reacted with lithium aluminum hydride to form the corresponding diol, 5-methyl-6-ethoxy-1,2,3,4,4a,5,8,8a-octahydronaphthalene-1,4-diol which is reacted with a hydrolyzing agent to produce 5-methyl-6-keto-perhydronaphthalene-1,4-diol. The reactions indicated above are described in detail in a copending application belonging to applicant's assignee, Serial No. 216,109, filed March 16, 1951. The 5-methyl-6-keto-perhydronaphthalene-1,4-diol is then reacted with N-(3-keto-butyl)-N,N-diethyl-N-methyl-ammonium iodide in the presence of potassium hydroxide to produce 7-keto-4b-methyl-1,2,3, 4,4a,4b,5,6,7,9,10,10a-dodecahydrophenanthrene-1,4-diol; this reaction is described in detail in U. S. Patent 2,617,828 which issued on November 11, 1952. The 7-keto-4b-methyl-1,2,3,4,4a,4b,5,6,7,9,10,10a - dodecahydrophenanthrene-1,4-diol is reacted with ethylene glycol in ethylene dichloride solution and in the presence of p-toluene sulfonic acid catalyst thereby forming 1,4-dihydroxy-4b-methyl-7-ethylenedioxy - 1,2,3,4,4a,4b,5,6,7,8,10,10a - dodecahydrophenanthrene. The 1,4-dihydroxy-4b-methyl-7-ethylenedioxy - 1,2,3,4,4a,4b,5,6,7,8,10,10a - dodecahydrophenanthrene is reacted with cyclohexanone and aluminum isopropoxide in benzene solution to produce the corresponding 1-keto-4-hydroxy-4b-methyl - 7 - ethylenedioxy-1,2,3,4,4a,4b,5,6,7,8,10,10a - dodecahydrophenanthrene. The reactions indicated hereinabove are described in detail in a co-pending application of applicant's assignee, Serial No. 286,808, filed May 8, 1952.

The 1-keto-4-hydroxy-4b-methyl-7-ethylenedioxy- 1,2,3,4,4a,4b,5,6,7,8,10,10a- dodecahydrophenanthrene is reacted with methyl iodide in the presence of potassium tertiary butoxide in benzene thereby forming 1-keto-2,4b-dimethyl-4-hydroxy-7-ethylenedioxy - 1,2,3,4,4a,4b,5,6,7,8,10,10a - dodecahydrophenanthrene; the latter compound is reacted with chromium trioxide-pyridine complex to form 1,4-diketo-2,4b-dimethyl-7-ethylenedioxy- 1,2,3,4,4a,4b,5,6,7,8,10,10a- dodecahydrophenanthrene. The methylation and oxidation reactions indicated hereinabove are described in detail in two co-pending applications belonging to the assignee of the present applicant Serial No. 306,488, filed August 26, 1952, and Serial No. 292,985, filed June 11, 1952, respectively. The 1,4-diketo-2,4b-dimethyl-7-ethylenedioxy - 1,2,3,4,4a,4b,5,6,7,8,10,10a - dodecahydrophenanthrene is reacted with methallyl iodide in a tertiary butyl alcohol solution of aluminum tertiary butylate, thereby forming 1,4-diketo-2-methallyl-2,4b-dimethyl - 7 - ethylenedioxy - 1,2,3,4,4a,4b,5,6,7,8,10,10a-dodecahydrophenanthrene. The latter compound is reacted in ether-benzene solution with an alkoxy-acetylene magnesium bromide to produce the corresponding 1-alkoxyethinyl - 1 - hydroxy - 2 - methallyl - 2,4b - dimethyl - 4 - keto - 7 - ethylenedioxy- 1,2,3,4,4a,4b,5,6,7,8,10,10a- dodecahydrophenanthrene. The reactions indicated hereinabove are described in detail in two co-pending applications of the applicant's assignee, Serial No. 306,509, filed August 26, 1952, now abandoned, and Serial No. 308,172, filed September 5, 1952. The 1-alkoxyethinyl-1 - hydroxy - 2 - methallyl - 2,4b - dimethyl - 4 - keto - 7- ethylenedioxy - 1,2,3,4,4a,4b,5,6,7,8,10,10a - dodecahydrophenanthrene is then brought into intimate contact with an aqueous mineral acid in solution in an organic solvent, preferably a 10% aqueous solution of sulfuric acid in the presence of tetrahydrofuran, and the slightly exothermic reaction which takes place is allowed to proceed at a temperature of about 25–30° C. for a period of about three to four hours thereby forming a reaction mixture containing my starting material, the 1-hydroxy-1 - carboalkoxymethyl - 2 - methallyl - 2,4b - dimethyl-4 - keto - 7 - ethylenedioxy - 1,2,3,4,4,4a,4b,5,6,7,8,10,10a-dodecahydrophenanthrene admixed with 1-carboalkoxymethylene - 2 - methallyl - 2,4b - dimethyl - 4 - keto - 7-ethylenedioxy - 1,2,3,4,4a,4b,5,6,7,8,10,10a - dodecahydrophenanthrene, the product of my reaction. These two compounds can be conveniently isolated from the reaction mixture by neutralizing the mineral acid with a saturated aqueous solution of sodium bicarbonate, distilling the organic solvent under reduced pressure, and extracting the oil which separates during distillation into ether. After washing, drying and evaporating the ether extract, there is obtained a residual oily material from which it is possible to separate the foregoing components in pure form by chromatography on acid-washed alumina. This is accomplished by dissolving the residual oily material in benzene-petroleum ether, contacting this solution with acid-washed alumina and eluting the adsorbate with a mixture of petroleum ether-ether. From the eluates richer in the petroleum ether component is obtained the 1-carboalkoxymethylene-2-methallyl-2,4b-dimethyl - 4 - keto - 7 - ethylenedioxy -

1,2,3,4,4a,4b,5,6,7,8,10,10a- dodecahydrophenanthrene and from the following fractions which contain a relatively higher proportion of ether is obtained the 1-carboalkoxymethyl-1-hydroxy-2-methallyl - 2,4b - dimethyl - 4 - keto - 7 - ethylenedioxy- 1,2,3,4,4a,4b,5,6,7,8,10,10a- dodecahydrophenanthrene. The reactions indicated hereinabove are described in a co-pending application of applicant's assignee, Serial No. 310,133, filed September 17, 1952.

Since 1 - carboalkoxymethylene - 2 - methallyl - 2,4b-dimethyl-4-keto-7-ethylenedioxy- 1,2,3,4,4a,4b,5,6,7,8,10,10a- dodecahydrophenanthrene is employed as a reactant in the next process operation in the total synthesis of cortisone, it was an object of the present invention to convert the 1 - hydroxy - 1 - carboalkoxymethyl - 2 - methallyl-2,4b-dimethyl-4-keto-7-ethylenedioxy- 1,2,3,4,4a,4b,5,6,7,8,10,10a- dodecahydrophenanthrene, obtained by a by product, as described hereinabove, to 1-carboalkoxymethylene-2-methallyl - 2,4b - dimethyl - 4 - keto - 7 - ethylenedioxy-1,2,3,4,4a,4b,5,6,7,8,10,10a - dodecahydrophenanthrene. I have discovered that this transformation can be accomplished by a novel dehydration process which comprises reacting 1 - hydroxy - 1 - carboalkoxymethyl - 2 - methallyl - 2,4b - dimethyl - 4 - keto - 7 - ethylenedioxy-1,2,3,4,4a,4b,5,6,7,8,10,10a - dodecahydrophenanthrene with thionyl chloride in the presence of a liquid medium characterized as being a solvent for the reactants. It is a feature of my process that, instead of isolating 1-carboalkoxymethylene - 2 - methallyl - 2,4b - dimethyl-4 - keto - 7 - ethylenedioxy - 1,2,3,4,4a,4b,5,6,7,8,10,10a-dodecahydrophenanthrene and 1 - hydroxy - 1 - carboalkoxymethyl - 2 - methallyl - 2,4b - dimethyl - 4 - keto-7 - ethylenedioxy - 1,2,3,4,4a,4b,5,6,7,8,10,10a - dodecahydrophenanthrene from the reaction mixture obtained as described hereinabove, the crude mixture containing both compounds can be reacted with thionyl chloride thereby converting the 1 - hydroxy - 1 - carboalkoxymethyl - 2-methallyl - 2,4b - dimethyl - 4 - keto - 7 - ethylenedioxy-1,2,3,4,4a,4b,5,6,7,8,10,10a - dodecahydrophenanthrene component to 1 - carboalkoxymethylene - 2 - methallyl-2,4b-dimethyl-4-keto-7-ethylenedioxy- 1,2,3,4,4a,4b,5,6,7,8,10,10a- dodecahydrophenanthrene. The chromatographic separation of 1 - carboalkoxymethylene - 2 - methallyl-2,4b-dimethyl-4-keto-7-ethylenedioxy- 1,2,3,4,4a,4b,5,6,7,8,10,10a- dodecahydrophenanthrene from 1 - hydroxy - 1 - carboalkoxymethyl - 2 - methallyl - 2,4b - dimethyl - 4 - keto-7 - ethylenedioxy - 1,2,3,4,4a,4b,5,6,7,8,10,10a - dodecahydrophenanthrene is thus eliminated and the 1-carboalkoxymethylene - 2 - methallyl - 2,4b - dimethyl - 4 - keto-7 - ethylenedioxy - 1,2,3,4,4a,4b,5,6,7,8,10,10a - dodecahydrophenanthrene originally present in the reaction mixture plus that formed by dehydration of 1-hydroxy-1-carboalkoxymethyl - 2 - methallyl - 2,4b - dimethyl - 4-keto-7-ethylenedioxy- 1,2,3,4,4a,4b,5,6,7,8,10,10a- dodecahydrophenanthrene is isolated in a single recovery operation. It is a further critical feature of my invention that thionyl chloride is a specific reagent for achieving the dehydration of 1-hydroxy-1-carboalkoxymethyl - 2 - methallyl - 2,4b - dimethyl - 4 - keto - 7-ethylenedioxy - 1,2,3,4,4a,4b,5,6,7,8,10,10a - dodecahydrophenanthrene to produce 1-carboalkoxymethylene-2-methallyl - 2,4b - dimethyl - 4 - keto - 7 - ethylenedioxy-1,2,3,4,4a,4b,5,6,7,8,10,10a - dodecahydrophenanthrene since, surprisingly enough, other common dehydrating agents result in extensive decomposition of the starting material and product with attendant formation of undesirable by products.

In carrying out my dehydration procedure, I ordinarily utilize, as the liquid medium, a tertiary amine, such as pyridine, picoline, quinoline, and the like. The reaction is preferably conducted by dissolving 1-hydroxy-1-carboalkoxymethyl - 2 - methallyl - 2,4b - dimethyl - 4 - keto-7 - ethylenedioxy - 1,2,3,4,4a,4b,5,6,7,8,10,10a - dodecahydrophenanthrene in pyridine and mixing the resulting solution with a pre-cooled solution of thionyl chloride in pyridine. The resulting solution is then preferably maintained at a temperature of about 0° C. under which conditions the dehydration reaction is substantially complete in about fifteen minutes, although higher or lower reaction temperatures and shorter or longer reaction times may be employed, if desired.

The isolation of 1 - carboalkoxymethylene - 2 - methallyl - 2,4b - dimethyl - 4 - keto - 7 - ethylenedioxy-1,2,3,4,4a,4b,5,6,7,8,10,10a - dodecahydrophenanthrene from the reaction mixture is conveniently conducted by evaporating the volatile components of the reaction mixture, preferably under reduced pressure, and subjecting the residual material to chromatography on alumina. Alternatively, the thionyl chloride component of the reaction mixture can be neutralized with aqueous alkali, for example, an alkali metal bicarbonate such as sodium bicarbonate, and the resulting mildly alkaline mixture extracted with a water-immiscible solvent such as petroleum ether, ethyl ether, or benzene. Upon evaporating the hydrocarbon solvent extract there is obtained the desired 1 - carboalkoxymethylene - 2 - methallyl - 2,4b - dimethyl-4 - keto - 7 - ethylenedioxy - 1,2,3,4,4a,4b,5,6,7,8,10,10a-dodecahydrophenanthrene in substantially pure form. The 1 - carboalkoxymethylene - 2 - methallyl - 2-4b - dimethyl - 4 - keto - 7 - ethylenedioxy - 1,2,3,4,4a,4b,5,6,7,8, 10,10a - dodecahydrophenanthrene thus obtained can be converted to steroid hormones such as cortisone in accordance with the following procedure: The 1 - carboalkoxymethylene - 2 - methallyl - 2,4b - dimethyl - 4 - keto-7 - ethylenedioxy - 1,2,3,4,4a,4b,5,6,7,8,10,10a - dodecahydrophenanthrene is reacted with an alkaline saponifying agent thereby forming 1 - carboxymethylene - 2 - methallyl - 2,4b - dimethyl - 4 - keto - 7 - ethylenedioxy - 1,2,3,4,4a,4b,5,6,7,8,10,10a - dodecahydrophenanthrene. The 1 - carboxymethylene - 2 - methallyl - 2,4b - dimethyl - 4 - keto - 7 - ethylenedioxy - 1,2,3,4,4a,4b,5,6,7,8,10,10a - dodecahydrophenanthrene is then reacted with an alkali metal in a lower alkanol or in liquid ammonia to produce 1 - carboxymethyl - 2 - methallyl - 2,4b - dimethyl - 4 - hydroxy - 7 - ethylenedioxy - 1,2,3,4,4a,4b,5,6,7,8,10,10a-dodecahydrophenanthrene. This compound is reacted with an esterifying agent, preferably an alkyl iodide in the presence of a base and/or a diazoalkene to produce the corresponding 1 - carboalkoxymethyl - 2 - methallyl-2,4b - dimethyl - 4 - hydroxy - 7 - ethylenedioxy - 1,2,3,4,4a,4b,5,6,7,8,10,10a - dodecahydrophenanthrene. This compound is reacted with an oxidizing agent, preferably under alkaline conditions, thereby forming the corresponding 1 - carboalkoxymethyl - 2 - methallyl - 2,4b - dimethyl-4 - keto - 7 - ethylenedioxy - 1,2,3,4,4a,4b,5,6,7,8,10,10a-dodecahydrophenanthrene. The latter compound is reacted with osmium tetroxide to form the osmate ester of 1 - carboalkoxymethyl - 2 - (beta, gamma - dihydroxyisobutyl) - 2,4b - dimethyl - 4 - keto - 7 - ethylendioxy-1,2,3,4,4a,4b,5,6,7,8,10,10a - dodecahydrophenanthrene, which is reacted with an aqueous alcoholic solution of an alkali metal sulfite or bisulfite to produce the corresponding 1 - carboalkoxymethyl - 2 - (beta, gamma-dihydroxyisobutyl) - 2,4b - dimethyl - 4 - keto - 7 - ethylenedioxy-1,2,3,4,4a,4b,5,6,7,8,10,10a - dodecahydrophenanthrene compound; the 1 - carboalkoxymethyl - 2 - (beta, gamma-dihydroxyisobutyl) - 2,4b - dimethyl - 4 - keto - 7 - ethylenedioxy - 1,2,3,4,4a,4b,5,6,7,8,10,10a - dodecahydrophenanthrene is reacted with periodic acid to form the corresponding 1 - carboalkoxymethyl - 2 - acetonyl - 2,4b-dimethyl - 4 - keto - 7 - ethylenedioxy - 1,2,3,4,4a,4b,5,6,7,8,10,10a - dodecahydrophenanthrene. The latter compound is reacted, under substantially anhydrous conditions, with a strong alkali thereby forming $\Delta^5$ - 3 - ethylenedioxy - 11,16,20 - triketo - pregnene. The $\Delta^5$ - 3 - ethylenedioxy - 11,16,20 - triketo - pregnene is reacted with an organic sulfonyl halide thereby forming the corresponding sulfonate ester of $\Delta^{5,16}$ - 3 - ethylenedioxy - 11, 20 - diketo - 16 - hydroxy - pregnadiene, which is reacted with hydrogen in the presence of a hydrogenation catalyst to produce $\Delta^5$ - 3 - ethylenedioxy - 11,20 - diketopregnene. The $\Delta^5$ - 3 - ethylenedioxy - 11,20 - diketopregnene is then reacted with an aqueous mineral acid solution whereupon the ethylenedioxy substituent attached to the 3-carbon atom is hydrolyzed and, at the same time, the double bond shifts from ring B to ring A to form $\Delta^4$ - 3,11,20 - triketo - pregnene.

The stereoisomeric form of $\Delta^4$ - 3,11,20 - triketo - pregnene having a melting point of about 175–176° C. possesses the stereoisomeric configuration characteristic of the naturally-occurring steroid hormones such as progesterone. We refer to this stereoisomer by the name of 11-keto progesterone. The compound is obtained in the form of a racemic mixture of the d- and 1-forms, and is referred to more specifically as dl - 11 - keto progesterone.

The 3-ethylenedioxy derivative of dl-$\Delta^4$-3,11,20-triketo-pregnene of melting point 175–176° C. may be converted to the therapeutically active material 3,11,20-triketo-17$\alpha$-hydroxy - 21 - acetoxy - $\Delta^4$ - pregnene as follows: dl - 3-ethylenedioxy - 11,20 - diketo - $\Delta^5$ - pregnene is treated with dimethyl oxalate and then with alkali to form the C-21 oxalyl acid derivative. On formation of the strychnine salts of the components of this racemic mixture the d-salt precipitates and may be recovered by filtration. Decomposition of this strychnine salt and hydrolysis of the C-21 oxalyl acid group yield 3 - ethylenedioxy - 11,20-diketo-$\Delta^5$-pregnene identical with that obtained from naturally-occurring materials.

Iodination under alkaline conditions of the natural isomer of the 21-oxalyl acid of 3-ethylenedioxy-11,20-diketo-$\Delta^5$-pregnene, which may be obtained in the above described resolution procedure, yields 3-ethylenedioxy-11,20-diketo-21-iodo-$\Delta^5$-pregnene. By treatment of this latter compound with potassium acetate there is obtained 3-ethylenedioxy-11,20-diketo-21-acetoxy-$\Delta^5$-pregnene of melting point 193.5–194° C.

Reaction of the last mentioned compound with hydrogen cyanide followed by dehydration of the C–20 cyanhydrin thus formed with phosphorous oxychloride yields 3 - ethylenedioxy - 11 - keto - 20 - cyano - 21 - acetoxy - $\Delta^{5,17}$-pregnadiene, which may be oxidized with potassium permanganate to 3-ethylenedioxy-11,20-diketo - 17$\alpha$ - hydroxy-21-acetoxy-$\Delta^5$-pregnene. 3,11,20 - triketo - 17$\alpha$ - hydroxy-21-acetoxy-$\Delta^4$-pregnene, alternatively known as cortisone acetate, may be prepared by acid hydrolysis of the above mentioned 3-ethylene-dioxy-11,20-diketo-17$\alpha$-hydroxy-21-acetoxy-$\Delta^5$-pregnene. The reactions indicated hereinabove are described in detail in a co-pending application of applicant's assignee, Serial No. 310,133, filed September 17, 1952.

The following examples illustrate methods of carrying out the present invention, but it is to be understood that these examples are given for purposes of illustration and not of limitation.

*Example 1*

A solution of 500 mg. of 1 - hydroxy - 1 - carboethoxymethyl - 2 - methallyl - 2,4b - dimethyl - 4 - keto - 7 - ethylenedioxy - 1,2,3,4,4a,4b,5,6,7,8,10,10a - dodecahydrophenanthrene in 5 ml. of pyridine was cooled to a temperature of about 0° C., and this solution was swirled while adding thereto 150 mg. of thionyl chloride. After the resulting solution had stood for a few seconds at 0° C., a precipitate of pyridine hydrochloride separated from the mixture, and after an additional fifteen minutes at 0° C., the reaction mixture was subjected to distillation at room temperature at a pressure of approximately 1 millimeter, thereby evaporating the volatile components from said mixture. The residual material was extracted with dry benzene and the benzene extract filtered thereby removing insoluble pyridine hydrochloride, and the filtered benzene solution was chromatographed on acid-washed alumina. The adsorbate was eluted with mixtures of ether and petroleum ether; upon evaporation of the 8:2 petroleum ether-ether eluate there was obtained substantially pure 1 - carboethoxymethylene - 2 - methallyl - 2,4b - dimethyl - 4 - keto - 7 - ethylenedioxy - 1,2,3,4,4a, 4b,5,6,7,8,10,10a - dodecahydrophenanthrene.

In accordance with the foregoing experimental procedure, and utilizing as starting material the stereoisomer of 1 - hydroxy - 1 - carboethoxymethyl - 2 - methallyl - 2,4b - dimethyl - 4 - keto - 7 - ethylenedioxy - 1,2,3,4,4a, 4b,5,6,7,8,10,10a - dodecahydrophenanthrene having an M. P. of 99–101° C., there was obtained the stereoisomer of 1 - carboethoxymethylene - 2 - methallyl - 2,4b - di - methyl - 4 - keto - 7 - ethylenedioxy - 1,2,3,4,4a,4b,5,6, 7,8,10,10a - dodecahydrophenanthrene having a M. P. of 153–155° C.

When the stereoisomer of 1 - hydroxy - 1 - carbo - ethoxymethyl - 2 - methallyl - 2,4b - dimethyl - 4 - keto - 7 - ethylenedioxy - 1,2,3,4,4a,4b,5,6,7,8,10,10a - dodecahydrophenanthrene having a M. P. of 144–146° C. was utilized, there was obtained the stereoisomer of 1 - carbo - ethoxy - methylene - 2 - methallyl - 2,4b - dimethyl - 4 - keto - 7 - ethylenedioxy - 1,2,3,4,4a,4b,5,6,7,8,10,10a - dodecahydrophenanthrene having a M. P. of 89–92° C.

*Example 2*

A solution of 500 mg. of 1 - hydroxy - 1 - carboethoxymethyl - 2 - methallyl - 2,4b - dimethyl - 4 - keto - 7 - ethylenedioxy - 1,2,3,4,4a,4b,5,6,7,8,10,10a - dodecahydrophenanthrene in 5 ml. of pyridine was cooled to a temperature of about 0° C., and this solution was swirled while adding thereto a cold (temperature approximately 0° C.) solution containing 150 mg. of thionyl chloride in 2 ml. of pyridine. After the resulting solution had stood for a few seconds at 0° C., a precipitate of pyridine hydrochloride separated from the mixture, and after an additional fifteen minutes at 0° C., the reaction mixture was subjected to distillation at room temperature at a pressure of approximately 1 millimeter, thereby evaporating the volatile components from said mixture. The residual material was extracted with dry benzene and the benzene extract filtered thereby removing insoluble pyridine hydrochloride, and the filtered benzene solution was chromatographed on acid-washed alumina. The adsorbate was eluted with mixtures of ether and petroleum ether; upon evaporation of the 8:2 petroleum ether-ether eluate there was obtained substantially pure 1 - carboethoxy - methylene - 2 - methallyl - 2,4b - dimethyl - 4 - keto - 7 - ethylenedioxy - 1,2,3,4,4a,4b,5,6,7,8,10,10a - dodecahydrophenanthrene.

The 1 - hydroxy - 1 - carboethoxymethyl - 2 methallyl - 2,4b - dimethyl - 4 - keto - 7 ethylenedioxy - 1,2,3,4,4a,4b, 5,6,7,8,10,10a - dodecahydrophenanthrene, used as starting material in Examples 1 and 2 hereinabove, can be prepared from 7 - keto - 4b - methyl - 1,2,3,4,4a,4b,5,6,7,9, 10, 10a - dodecahydrophenanthrene - 1,4 - diol (the preparation which is described in U. S. Patent No. 2,617,828 which issued on November 11, 1952), in accordance with the following procedure:

Into a five-liter flask equipped with a stirrer, a one-liter dropping funnel and a sidearm with condenser attached in distilling position, were placed 38.9 g. (0.155 mole) of 4b - methyl - 1,2,3,4,4a,4b,5,6,7,9,10,10a - do - decahydrophenanthrene - 1,4 - diol - 7 - one, 40 cc. (0.645 mole) of glycol, 2500 cc. of ethylene dichloride and 0.4 g. (0.002 mole) of p-toluene sulfonic acid. This mixture was set stirring. Enough heat was applied to distill off three liters of the azeotrope of the solvent and water, formed as a by-product, during a three-hour period. During this time an additional 1500 cc. of ethylene dichloride was added to keep the reactants in solution. After three hours the reaction mixture was cooled and thoroughly shaken with 50 cc. of an aqueous 1 Normal potassium bicarbonate solution. The aqueous carbonate layer was drawn off and twice extracted with ethylene dichloride. All three ethylene dichloride extracts were then combined, dried over anhydrous magnesium sulfate and concentrated. This concentrate was taken up in one liter of acetone and concentrated until crystals just began to come out. Filtration of the cold acetone gave the crude crystalline product 4b - methyl - 7 - ethylenedioxy - 1,2,3,4,4a,4b,5,6,7,8,10,10a - dodecahydrophenanthrene - 1,4 - diol which can be further purified by recrystallization from acetone. The pure product melts at 189° C.

Eighty-six and five tenths grams (0.294 mole) of 4b-methyl - 7 - ethylenedioxy - 1,2,3,4,4a,4b,5,6,7,8,10,10a-dodecahydrophenanthrene-1,4-diol was dissolved in 2130 g. (2,250 cc., 21.7 moles) of cyclohexanone, and 2,250 cc. of benzene. To this solution was added 86.5 g. (0.424 mole) of aluminum isopropoxide, and the whole was then set to reflux for twelve hours. At the end of this time 25 cc. of water was added. The coagulated aluminum hydroxide thus formed was filtered off. The filtrate was concentrated and dried in vacuo, leaving a residue which, on trituration with petroleum ether, gave the crude crystalline product 4b-methyl-7-ethylenedioxy-1,2,3,4,4a,4b,5,6,7,8,10,10a - dodecahydrophenanthrene-4-ol-1-one. It can be purified by recrystallization from acetone and melts at 219–220° C.

To 10.0 g. of 4b-methyl-7-ethylenedioxy-1,2,3,4,4a,4b, 5,6,7,8,10,10a - dodecahydrophenanthrene - 4 - ol - 1 - one dissolved in 120 ml. of benzene and 70 ml. of t-butyl alcohol was added, at reflux temperature, 1.5 equivalents of 1 N potassium t-butoxide in t-butyl alcohol, and 20 ml. of a 1:1 solution of methyl iodide in benzene. After thirty minutes of refluxing, the solution was quenched with water, concentrated in vacuo, and the concentrate extracted with CHCl₃. The CHCl₃ extract was dried and the solvent removed in vacuo. Fractional crystallization of the crystalline residue from ethyl acetate, yielded the desired product, 2,4b-dimethyl-7-ethylenedioxy - 1,2,3,4,4a,4b,5,6,7,8,10,10a - dodecahydrophenanthrene-4-ol-1-one, M. P. 189–192° C.

A solution of 3.12 g. of 2,4b-dimethyl-7-ethylenedioxy - 1,2,3,4,4a,4b,5,6,7,8,10,10a - dodecahydrophenanthrene-1-one-4-ol (M. P. 189–192° C.) in 30 cc. of pyridine was combined with 3.1 g. of chromium trioxide in 30 cc. of pyridine. The reaction flask was stoppered, the contents mixed thoroughly and allowed to stand at room temperature overnight. The reaction mixture was poured into water and extracted with three portions of benzene-ether (1:1) with filtration through diatomaceous earth to break the emulsions. After washing with water, the combined organic solution was dried over anhydrous magnesium sulfate and concentrated with final drying of the residue under vacuum. Crystallization from ether gave crystalline 2,4b-dimethyl-7-ethylenedioxy-1,2,3,4,4a,4b,5,6,7,8,10,10a - dodecahydrophenanthrene-1,4-dione; M. P. 130–145° C. Chromatography over alumina and elution with petroleum ether-ether (8:2) gave two purified isomers, M. P. 135–136° C. and 152–153° C.

A solution of 16.0 g. of crude 2,4b-dimethyl-7-ethylenedioxy - 1,2,3,4,4a,4b,5,6,7,8,10,10a - dodecahydrophenanthrene-1,4-dione (M. P. 130–145° C. and consisting of a mixture of isomers M. P. 135–136° C. and 152–153° C.) in 190 cc. of benzene was concentrated to 160 cc. to insure dryness. The solution was then placed under nitrogen, and treated successively with 16.0 cc. of methallyl iodide and 70 cc. of tertiary butyl alcohol containing 2.31 g. of dissolved potassium. After standing at room temperature for three hours, the mixture was poured into ether, the ethereal solution washed with water, concentrated to dryness and purified by chromatography on either acid washed or alkaline alumina, the product being eluted with petroleum ether-ether mixtures. Pure 2,4b-dimethyl - 2 - methallyl - 7 - ethylenedioxy - 1,2,3,4,4a, 4b,5,6,7,8,10,10a - dodecahydrophenanthrene - 1,4 - dione was obtained, M. P. 108–109° C.

Another isomeric form of this compound having a melting point of 138–139° C. was also recovered from the chromatographic column.

A solution of ethyl magnesium bromide (0.1526 m.) was prepared in the usual manner from 3.7 g. of magnesium and excess ethyl bromide in 100 ml. of dry ether. A solution of 11.74 g. of ethoxyacetylene (0.165 m.) diluted with dry ether to a total volume of 40 ml. was added gradually to the ethyl Grignard and stirred until the evolution of ethane ceased. 120 ml. of dry benzene was added to dissolve the ethoxyacetylene magnesium bromide.

A solution of 27 g. of dry 2,4b-dimethyl-2-methallyl-7 - ethylenedioxy - 1,2,3,4,4a,4b,5,6,7,8,10,10a - dodecahydrophenanthrene-1,4-dione (stereoisomer of M. P. 108–109° C.) in 150 ml. of dry benzene was added rapidly to the stirred Grignard solution. After standing at room temperature for two hours, the reaction mixture was decomposed by pouring into ice-water. Enough saturated aqueous ammonium chloride was added to break the emulsion which formed. The benzene-ether layer was separated and washed once with water. The aqueous layer was extracted again with 500 ml. of 1:1 benzene-ether solution which, after one water-wash, was combined with the original extract. After drying over anhydrous sodium sulfate and removal of the latter by filtration, the solvents were distilled in vacuo. From a solution of the residual oil in ether were obtained crystals of the stereoisomer of 1-ethoxyethinyl-2,4b-dimethyl-2-methallyl - 7 - ethylenedioxy - 1,2,3,4,4a,4b,5,6,7,8,10,10a-dodecahydrophenanthrene-1-ol-4-one having an M. P. of 133–134° C.

By using a stereochemical modification of the above starting material, M. P. 138–139° C., and treating as above described, there was obtained the stereochemical modification of 1-ethoxyethinyl-2,4b-dimethyl-2-methallyl - 7 - ethylenedioxy - 1,2,3,4,4a,4b,5,6,7,8,10,10a-dodecahydrophenanthrene-1-ol-4-one having an M. P. of 131–132° C.

To a solution of 24 g. of 1-ethoxyethinyl-2-methallyl-2,4b - dimethyl - 7 - ethylenedioxy - 1,2,3,4,4a,4b,5,6,7,8,10,10a-dodecahydrophenanthrene-1-ol-4-one (M. P. 133–134° C.) in 160 ml. of tetrahydrofuran was added 10 ml. of 10% aqueous sulfuric acid. The resulting mixture was maintained at a temperature within the range of 27° C. to 29° C. for a period of about three and one-half hours. At the end of this time, an excess of a saturated aqueous solution of sodium bicarbonate was added to the reaction mixture, and the tetrahydrofuran was evaporated from the aqueous mixture under reduced pressure. The oil which separated was extracted into ether; the ether extract was washed once with water, dried over sodium sulfate, and the ether was evaporated. The residual oily material was dissolved in ether and chromatographed on acid-washed alumina. The adsorbate was eluted with mixtures of ether and petroleum ether upon evaporation of the 7:3 petroleum ether-ether eluate there was obtained -carboethoxymethyl-2-methallyl-2,4b-dimethyl - 7 - ethylenedioxy - 1,2,3,4,4a,4b,5,6,7,8,10,10a-dodecahydrophenanthrene-1-ol-4-one having an M. P. of 99–101° C.

By using the stereochemical modification of the above 1-ethoxyethinyl-2-methallyl-2,4b-dimethyl - 7 - ethylenedioxy - 1, 2, 3, 4, 4a,4b,5,6,7,8,10,10a - dodecahydrophenanthrene-1-ol-4-one starting material having an M. P. of 131–132° C. there was obtained the stereoisomer of 1-carboethoxymethyl-2-methallyl-2,4b-dimethyl -7 - ethylenedioxy-1,2,3,4,4a,4b,5,6,7,8,10,10a-dodecahydrophenanthrene-1-ol-4-one having an M. P. of 146° C.

Various changes and modifications may be made in carrying out the present invention without departing from the spirit and scope thereof. Insofar as these changes and modifications are within the purview of the annexed claims, they are to be considered as part of my invention.

I claim:

1. The process which comprises bringing together in a liquid medium comprising a tertiary amine at a temperature of approximately 0° C., 1-hydroxy-1-carboalkoxymethyl-2-methallyl-2,4b-dimethyl-4-keto-7- ethylenedioxy-1,2,3,4,4a,4b,5,6,7,8,10,10a-dodecahydrophenanthrene and thionyl chloride thereby producing 1-carboalkoxymethylene-2-methallyl-2,4b-dimethyl-4-keto-7-ethylenedioxy-1,2,-3,4,4a,4b,5,6,7,8,10,10a-dodecahydrophenanthrene.

2. The process which comprises reacting 1-hydroxy-1-carboethoxymethyl-2-methallyl-2,4b-dimethyl-4 - keto - 7 - ethylenedioxy-1,2,3,4,4a,4b,5,6,7,8,10, 10a - dodecahydrophenanthrene with thionyl chloride, said reaction being carried out by bringing the reactants together in pyridine containing a small amount of ionic chloride, at a temperature of approximately 0° C., thereby producing 1-carboethoxymethylene-2-methallyl - 2,4b - dimethyl - 4 - keto-7-ethylenedioxy-1,2,3,4,4a,4b,5,6,7,8,10,10a - dodecahydrophenanthrene.

References Cited in the file of this patent

UNITED STATES PATENTS 2,270,409     Butenandt et al. _____ Jan. 20, 1942

OTHER REFERENCES

Darzens, Compt rend., vol. 152, 1601 (1911).

Fieser et al., "Natural Products Related to Phenanthrene," ACS Monograph No. 70, pp. 277–78, 339–40 (1949).